INVENTOR.
JOSEPH F. STEPHANY
BY Samuel R. Genca
ATTORNEY

OPTICAL COMMUNICATION SYSTEM
Filed Oct. 21, 1965 2 Sheets-Sheet 2
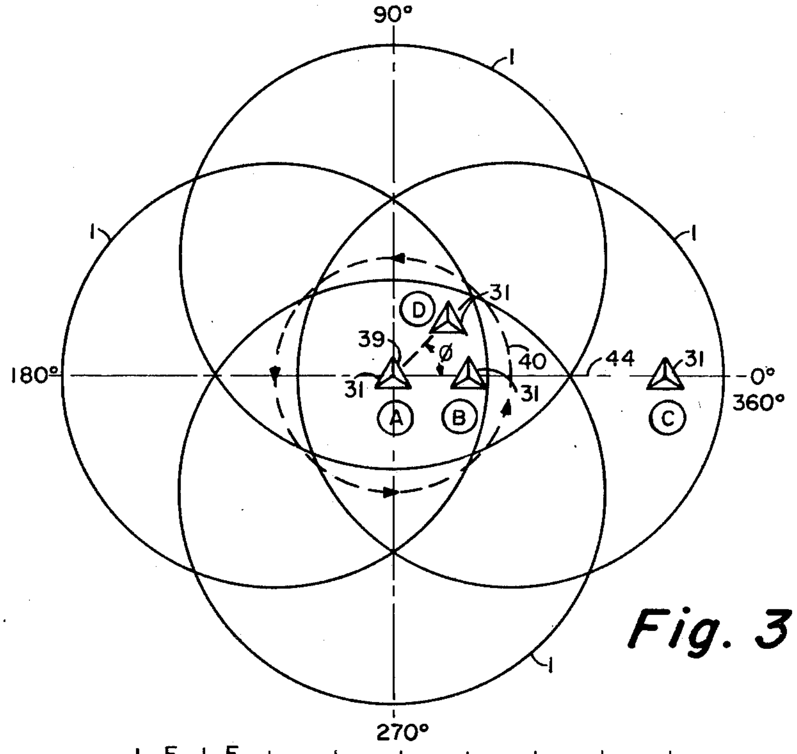
Fig. 3
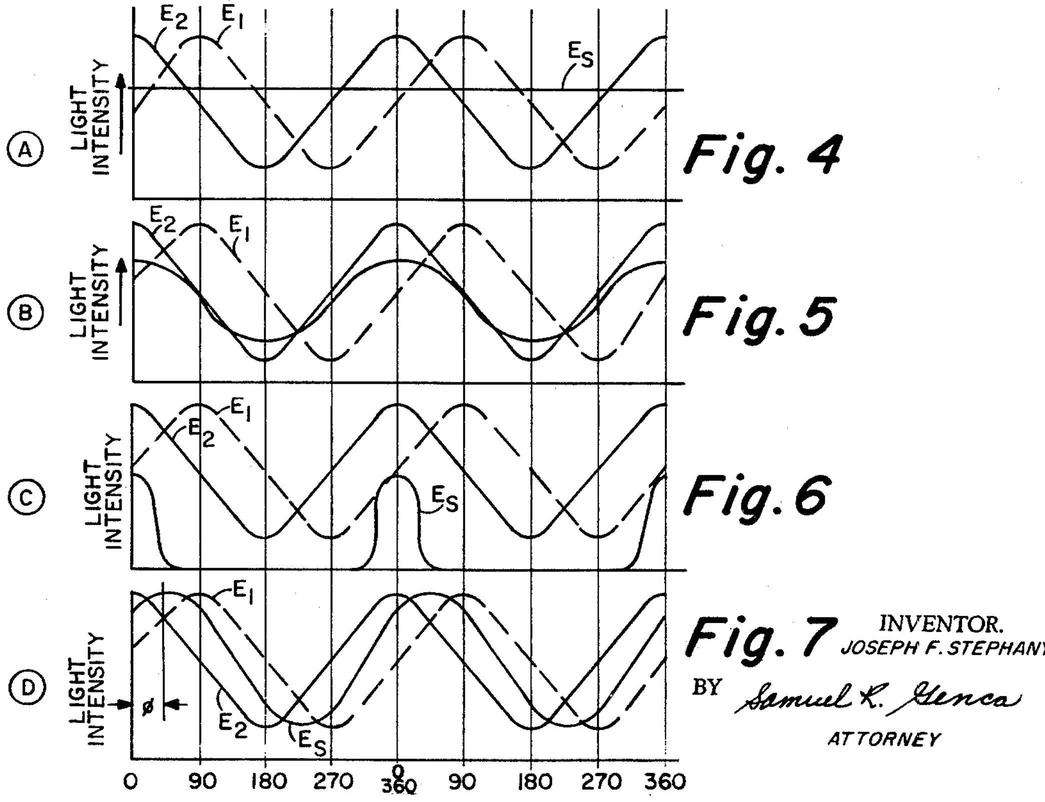
Fig. 4
Fig. 5
Fig. 6
Fig. 7
INVENTOR.
JOSEPH F. STEPHANY
BY Samuel R. Genca
ATTORNEY 3,504,979
OPTICAL COMMUNICATION SYSTEM

Joseph F. Stephany, Rochester, N.Y., assignor to General Dynamics Corporation, a corporation of Delaware Filed Oct. 21, 1965, Ser. No. 499,516
Int. Cl. G01b *11/27*
U.S. Cl. 356—172 1 Claim

ABSTRACT OF THE DISCLOSURE

A tracking system for locking a laser beam on a reflecting target is described. An optical wedge which is driven by a motor deflects the beam in a circular path. An error signal is derived from the reflected beam and is applied to a servo system for deflecting the beam such that it is locked on the target.

The present invention relates to an optical communication system and also to an optical tracking system.

The invention is especially suited for use in a laser communication system of the type wherein a modulated laser beam from a transmitter is light coupled to a receiver or transponder for the transfer of information. The laser beam may be frequency or amplitude modulated for the transfer of energy or information. The laser beam has been found to be an effective communication link, since many channels of information may be carried by the laser beam and extremely narrow beam widths can be used permitting communication over large distances with very low power.

One of the outstanding problems of communication by way of a laser beam is that the transmitter and receiver or transponder have to be accurately aligned, so that little or no radiant energy is lost by a deviation error, that is, a misalignment between the transmitter and the transponder or receiver.

The intensity of a cross section of a laser beam may be expressed by the equation $$I(r)=\frac{2P}{\pi a^2}e^{-2r^2/a^2} \quad (1)$$

Where I($r$) is the intensity in watts/cm.$^2$; $r$ is the perpendicular distance from the center of the beam; P is the total laser beam power; $a$ is the effective radius of the beam (at which the insensity is down to $1/e^2$ of the intensity at the center of the laser beam) and $e$ is the base of Napierian logarithms (viz 2.71828).

It can be seen from the above equation that the beam intensity decreases quite rapidly at the edge or fringe of the laser beam, and if the laser beam is only slightly misaligned, much energy will be lost during the transmission.

Accordingly, it is an object of the present invention to provide an improved system for tracking a reflecting or transponding or receiving station or a target by means of a radiant energy beam.

It is another object of the present invention to provide for an automatic alignment of a light beam between a transmitter and a transponder, receiver or target.

It is still another object of the present invention to provide an efficient, optical communication system in which the same optical beam as is used primarily for communication is also used for aligning the beam with respect to transmitting and transponding or reflecting station.

Briefly described, an improved tracking system embodying the inventiond includes a transmitter having a motor system for orienting and continuously deflecting a radiant energy beam, such as a laser beam, with respect to a receiving station or target which returns the beam to the transmitter. The transmitter also includes a transducing device which converts the beam into a signal. The continuous deflection of the beam is synchronous and the path of deflection is circular in a plane normal to the beam, so that the signal is a DC voltage when there is a correct alignment and is sinusoidal having an amplitude and phase which is a function of the misalignment of the beam with respect to the target. This signal controls the orienting motor system so as to locate the beam on target.

The invention itself, both as to its organization and method of operation, as well as additional objects and advantages thereof, will become more readily apparent from a reading of the following description in connection with the accompanying drawings in which:

FIG. 3 is a sectional view along the plane 3—3 in FIG. 2 which shows a retro-reflector in various positions relative to a continuously deflected laser beam which is deflected in a circular path relative to the retro-reflector; and FIGS. 4–7 show a series of electrical output signals which are produced by a photo-detector when the target is in various positions (A to D) with respect to the beam.

Figure 1:
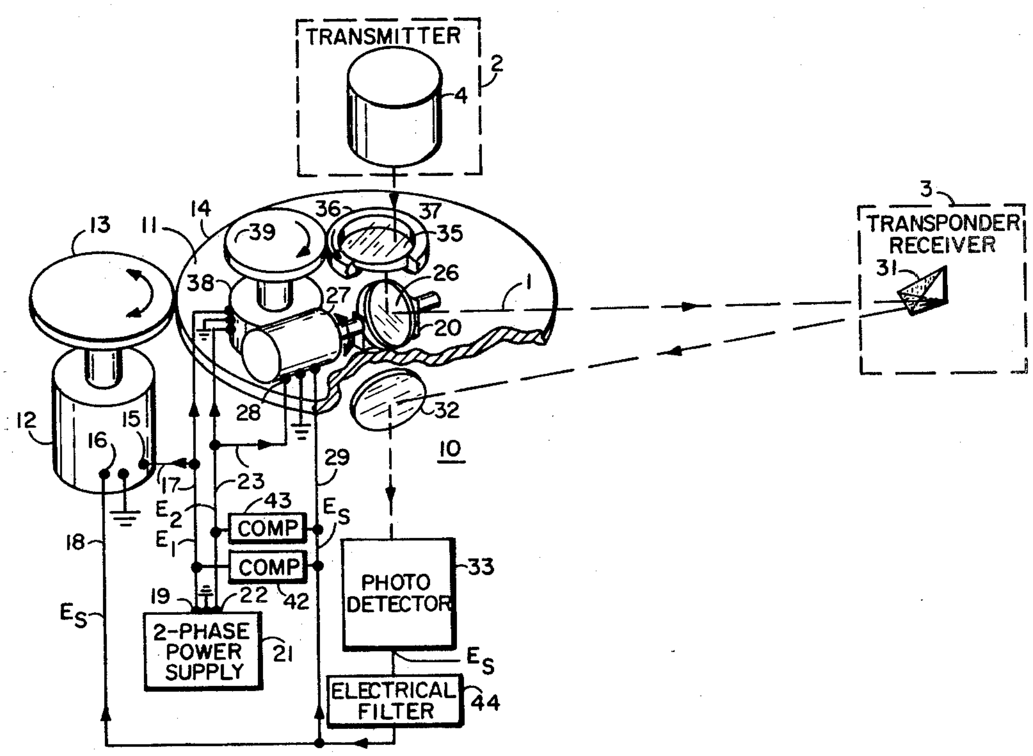
FIG. 1 is a schematic view, fragmentary in part, of the tracking system, including a block diagram of the electrical circuit utilized in the tracking system in accordance with the invention.

Referring now to FIG. 1, a laser communication system is shown which includes a tracking system 10. A laser beam 1 from a transmitter 2 is directed by the tracking system to a remote target at which is positioned a transponder 3. The laser beam 1 may be modulated for the transfer of energy in a manner well known to those skilled in the art for communicating between the transponder 3 and the transmitter 2.

The tracking system 10 includes a turntable or azimuth plate 11 driven by an azimuth servo motor 12 through a drive gear 13 on the servo motor 12 and a driven gear 14 on the azimuth plate 11. The servo motor 12 may be of the AC type which includes two input terminals 15 and 16 connected to leads 17 and 18 respectively. The terminals 15 and 16 are connected to different windings (not shown) which are returned to ground. The azimuth servo motor 12 is operable to turn the azimuth plate 11 in a horizontal plane when energized by two AC signals, each having different electrical phase angles with respect to each other. The azimuth servo motor 12 is at rest when a DC voltage is applied to the input terminal 16 and lead 18. Input terminal 15 on the azimuth servo motor 12 and lead 17 are connected to an output terminal 19 of a two phase power supply 21 which supplies an electrical AC reference voltage $E_1$ of one phase at output terminal 19 and another electrical AC reference voltage $E_2$ of another phase at output terminal 22 and to leads 17 and 23 respectively. The two electrical AC reference voltages $E_1$ and $E_2$ are orthogonal to each other (90° out of phase with each other). The AC reference voltage $E_1$ has a phase angle which may be referred to as the azimuth reference phase angle $\angle\phi_x$ on lead 17 and the AC reference voltage $E_2$ has a phase angle which may be referred to as the altitude reference phase angle $\angle\phi_y$ on lead 23. The AC electrical wave shape of the azimuth and altitude reference voltages $E_1$ and $E_2$ are shown in FIGS. 4–7. The frequency of the AC voltages $E_1$ and $E_2$ are equal and may be, for example, 60 c.p.s.

The laser beam source 4 is mounted by a structure (not shown) on the azimuth plate 11, so that the laser beam 1 is collimated at a given point on the azimuth plate 11 and rotates in unison with the azimuth plate 11. In some cases, it may be desirable to fix the transmitter 2 and the laser beam source 4 on a stationary frame and direct the laser beam 1 through an optical system including prisms to the given point on the azimuth plate 11. In either case, it is directed at the given point on the azimuth plate 11.

The tracking system 10 further includes a mirror 26 mounted on the azimuth plate 11 by a supporting structure 20 and an altitude servo motor 27 fixed to the supporting structure 20. The altitude servo motor 27 is coupled to the mirror 26 for tilting the mirror 26 about a horizontal axis through the reflecting face of the mirror 26. The mirror 26 is in registry with the laser beam source 4 and the laser beam 1. The altitude servo motor 27 is also of the AC type for elevating or depressing the laser light-beam 1 in a vertical plane substantially normal to a horizontal plane through the azimuth plate 11. The altitude servo motor 27 is somewhat similar to the azimuth servo motor, in that it is in the operating state when the AC electrical reference voltage $E_2$ on lead 23 has a different electrical phase than an AC electrical signal on a lead 29 connected to the altitude servo motor 27. The altitude servo motor 27 is at a rest state when a DC electrical voltage is applied to the lead 29.

The transponder 3, in accordance with the invention, includes a corner cube retro-reflector 31 which includes three reflecting fixed surfaces or mirrors perpendicular to each other, so that a light beam or a laser beam will be reflected substantially along the same path from whence it came. Other types of retro-reflectors, such as a "cat's eye" may be used without departing from the invention. The transponderer 3 and the retro-reflector 31 are spaced apart from the transmitter 2. The spacing may be a few feet or hundreds of miles.

Another mirror 32 is mounted directly below the altitude mirror 26 on the azimuth plate 11 and positioned at 45° with the azimuth plate 11. The mirror 32 is in registry with a photo-detector 33 for directing any reflected light from the retro-reflector 31 to the photo-detector 33.

The tracking system 10, in accordance with the invention, includes a continuously rotating optical wedge 35 which is mounted in a lens mount 36 having an external driven gear 37. The optical wedge 35 is interposed between the laser beam source 4 and the retro-reflector 31. The optical wedge 35 is continuously rotated at a predetermined number of revolutions per second by a synchronous or clock motor 38 through a driving gear 39. The clock motor 38 is supplied by the two phase power supply 21 by way of the leads 17 and 23. The clock motor 38, for example, is driven by the sixty cycle (60 c.p.s.) two phase reference voltages $E_1$ and $E_2$ from the two phase power supply 21.

Figure 2:
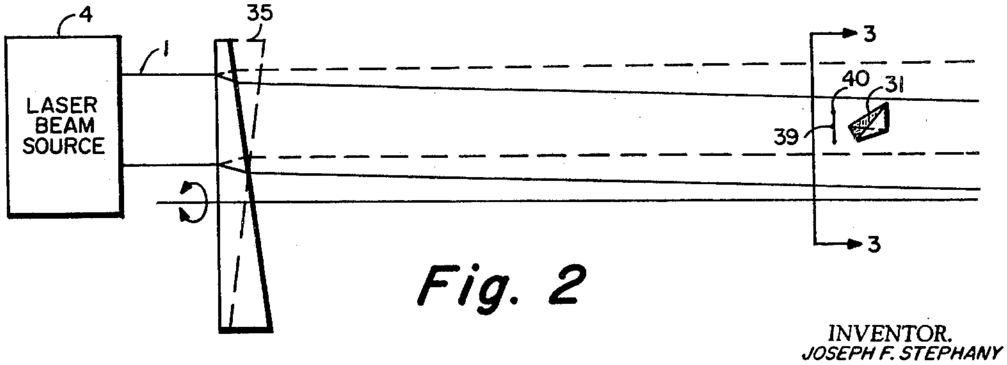
FIG. 2 illustrates a laser beam being deflected relative to a retro-reflector by an optical wedge in accordance with the invention.

The optical wedge 35 continuously deflects the laser beam 1 in a continuous circular path normal to the beam direction such that the locus of points of the center of the laser beam 1 defines in the plane of the reflector a circle 40, as shown in FIGS. 2 and 3. In FIG. 2, the optical wedge 35 is shown interposed between the laser beam source 4 and the retro-reflector 31. The mirror 26 has been eliminated to show how the continuously rotating wedge 35 deflects the laser beam with respect to the retro-reflector 31. The circular path and circle 40 are normal to the direction of the beam 1.

Referring to FIG. 3, the laser beam 1 is shown as being deflected counter-clockwise in the circular path about the center 39 of the circle 40. The laser system may be operated, for example, in the lowest order mode (TEM00) and therefore the beam 1 is shown as being substantially circular in cross section. The system 10 will, however, operate at other modes. The beam 1 is shown at four different positions 0°–90°–270° and 360°, in its path of rotation. It should be understood that the beam 1 is swept through the circular path continuously in synchronism with the reference voltages $E_1$ and $E_2$. The retro-reflector 31 is shown in various positions (A–D). Positions (B–D) are positions where the laser beam is "off target" from the retro-reflector 31 and the transponder 3.

The laser beam 1, when continuously deflected in the circular path should at least illuminate the retro-reflector 31 at least once in each revolution, in order to derive an output signal at the photo-detector 33. Further, to avoid "blind spots," the beam 1 should traverse the center 39 of the circle 40 or at least a reflecting part of the retro-reflector 31. Thus, the effective area covered by the tracking system 10 is determined by the width of the beam 1 and the radius of the circle 40. A suitable area would be another circle having a diameter equal to twice the diameter of the beam.

It should be pointed out that the laser beam 1 should be roughly aligned with the transponder 3 and the retro-reflector 31 before the beam is continuously deflected. This may be accomplished by visual means or by automatic means which scan a given region with a fan or cone shaped beam and lock on to the target when light is reflected from the retro-reflector 31 to the photo-detector 33. The automatic means or visual means is used only to approximately align the laser beam 1 with the transponder 3. A more accurate alignment and one which is automatic is accomplished by the tracking system 10 by continuously deflecting the laser beam 1 in the circular path. At least a portion of the laser beam 1 must be reflected by the retro-reflector 31, so as to indicate that the laser beam is nearly light coupled to the transponder 3.

The retro-reflector 31 is smaller in size than the cross-sectional area of the beam 1 (FIGS. 2 and 3), so that only a portion of the laser beam 1 is reflected by the retro-reflector 31. The continuously deflected laser beam 1 may either generate a DC electrical signal or an AC electrical signal when it is reflected onto the photo-detector 33. Thus, the output signal $E_s$ of the photo-detector 31 can be either a DC electrical output signal or an AC electrical output signal which will have a phase angle which is indicative of the relative position of the target or transponder 3 to the center of the circle 40. If the laser beam 1 is "on target" (viz at position A) it will continuously sweep around the retro-reflector 31 at a given predetermined number of revolutions per second and will illuminate the retro-reflector with the same intensity for 360° of each revolution. In this case, the retro-reflector 31 is disposed at the center of the circle 40. Since the same intensity of illumination is reflected back to the photo-detector 33 for (360°) of each revolution, the photo-detector 33 derives a DC electrical output voltage or an AC signal having a DC level, and corresponds to the position (A), as shown in FIG. 4.

If the laser beam 1 is "off target," however, the continuously deflected laser beam 1 will reflect illumination of varying intensity, which is a function of the position of the retro-reflector 31 with respect to the center of the circle 40 and an imaginary axis (0°) or radius. In response to the varying intensity of the reflected beam 1, the photo-detector 33 derives a sinusoidal error signal $E_s$. The sinusoidal error signal $E_s$ is a function of the position of the retro-reflector 31 with respect to the center of the circle 40 and the instant of time the greatest intensity of the reflected beam occurs. A horizontal axis or radius 44 may be considered as the reference or 0° axis Assuming now that the transponder 3 is at a position B (FIGS. 3 and 5), the photo-detector 33 will derive an AC error signal $E_s$ having a voltage wave shape which decreases sinusoidally from a maximum value at 0° as the laser beam 1 is deflected in a counter-clockwise direction for ninety (90°) degrees, and continues to decrease until it reaches 180°, at which time the voltage increases until it reaches the 0° axis again. The AC error signal $E_s$ derived by the photo-detector 33 for position B has an electrical wave shape as seen in FIG. 5, which follows the changing levels of intensity of the reflected laser beam 1. The intensity of the reflected beam is at a maximum at zero degrees and continuously decreases until the laser beam 1 passes the 180° axis, at which time the level of the intensity of the reflected beam continues to increase until it reaches the 0° axis again In FIG. 6, the retro-reflector 31 is displaced from the center of the circle 40 at position C along the 0° axis. In this position C of the retro-reflector 31, the laser beam 1 will be reflected by the retro-reflector 31 for only a part of each revolution of the laser beam 1, so that the signal voltage $E_s$ of the photo-detector 33 will appear substantially as pulses, each pulse will have a maximum voltage at 0° and the lowest level of the error signal $E_s$ will occur when the laser beam 1 is completely "off target" and not reflected by the retro-reflector 31.

Referring to FIGS. 3 and 7, the retro-reflector 31 is disposed at position D which is a given distance from the center of the circle and at an angle $\phi$ which may be, for example, 45°. The photo-detector 33, in response to the continuously sweeping laser beam 1, drives a sinusoidal electrical error signal $E_s$ which leads the reference voltage $E_1$ and lags the reference voltage $E_2$, as shown in FIG. 7.

The reference voltages $E_1$ and $E_2$ may each be compared with the error signal $E_s$ in comparators 42 and 43 respectively, to derive a visual indication of the altitude and azimuth displacement respectively, of the retro-reflector 31 and the transponder 3. The comparator 42 is connected to the two phase power supply 21 by way of lead 17 and to the photo-detector 33 by way of the lead 29. The comparator 43 is connected to the two-phase supply 21 by way of lead 23 and to the output of the photo-detector 33 by way of lead 29. The comparator 42 and 43 may be AC phase meter which derive an output when a difference in phase exists between the signal $E_s$ and reference voltage $E_1$ or $E_2$ respectively. The comparator 42 and 43 may also be difference amplifiers which produce an output signal as long as a difference in voltage exists between leads 29 and 17 and leads 29 and 23 respectively.

In the operation of the tracking system 10, the clock motor 38 continuously drives the optical wedge 35 at a given number of revolutions per second. For example, sixty (60) revolutions per second. Other frequencies may be selected provided, of course, the frequency of reference voltages $E_1$ and $E_2$ are the same. The clock motor 38 is supplied by the two-phase power supply 21 which furnishes a 60 cycle, two-phase voltage $E_1$ and $E_2$ so that each electrical cycle has the same time period as each mechanical cycle of the driven optical wedge 35. In other words, each cycle of the driven optical wedge 35 is synchronous with the AC electrical voltages $E_1$ and $E_2$. The phase of the optical wedge 35 relative to the orthogonal reference voltages $E_1$ and $E_2$ may be suitably adjusted by rotating the clock motor 38 on the azimuth plate 11.

The optical wedge 35, when continuously rotated, deflects the laser beam 1 into the circular path. The locus of points of the center of the continuously deflecting beam 1 is the circle 40 as previously mentioned. The diameter of the circle 40 is a function of the wedge angle of the optical wedge 35. The wedge angle of the optical wedge 35 may be varied to increase or decrease the effective area which may be illuminated by the laser beam 1. In a preferred embodiment, the size of the wedge angle is such that the cross-sectional area beam 1 traverses the center of the circle 40. This will insure that the center of the circle will always be illuminated and that no "blind spot" will exist as the center at the circle, as previously mentioned. Thus, a suitable effective area of the tracking system may be a circle having at least a diameter equal to twice the diameter of the beam 1. Stated in another way, the circle 40, for example, may have a radius which is no greater than the radius of the beam 1. The smaller the circle 40 is the greater the accuracy is, but the effective area of the tracking system 10 is decreased a corresponding amount.

The altitude servo motor 27 turns the mirror 26 about the horizontal axis which extends through the face of the mirror 26 only when the error signal $E_s$ from the photo-detector 33 is out of phase with the reference voltage $E_2$ on line 23. The azimuth servo motor 12 turns the azimuth plate 11 through drive gear 13 only when the AC error signal $E_s$ on line 18 is out of phase with the reference voltage $E_1$ on line 23. The azimuth and altitude servo motors 12 and 17 respectively, are at rest, that is they do not drive the azimuth plate 11 or mirror 26 respectively, if the error signal $E_s$ is a DC voltage from the photo-detector 33.

Let it be assumed that the laser beam 1 is "on target," that is to say, the retro-reflector 31 is disposed at the center of the circle 40. The laser beam 1 is continuously deflected in the circular path by the optical wedge 35 and illuminates the retro-reflector at a constant illumination level or intensity for 360° during each revolution. The retro-reflector 31 reflects the laser beam 1 to the mirror 32 and on to the photo-detector 33. The photo-detector 33, in response to the constant level illumination or intensity, derives the error signal $E_S$ which is a constant or DC electrical output. The error signal $E_s$ is applied to lines 18 and 29. The azimuth servo motor 12 and the altitude servo motor 27 then remain in the rest state because of the DC electrical output. The laser beam 1 therefore remains "on target." The transponder 3 and the retro-reflector 31 may move with respect to the transmitter 2 and the tracking system 10 will continue to track and adjust the position of the azimuth plate 11 and the mirror 26, so as to lock on to the transponder 3. This may be seen when the laser beam 1 is "off target."

Considering first that the retro-reflector 31 is in position B, as shown in FIG. 3, position A being "on target" as was previously described. When the retro-reflector 31 is disposed at position B along the zero reference axis, the laser beam 1 illuminates the retro-reflector 31 with varying intensity during each revolution. The amount of illumination intensity depends upon the position of the retro-reflector 31 in the circular path. At point B, the retro-reflector 31 will have a maximum intensity at the zero axis, and the error signal $E_s$ of the photodetector 33 will have a voltage peak at zero degrees, as shown in FIG. 5. As the laser beam 1 moves in a counter-clockwise direction in the circular path, the intensity of illumination on the retro-reflector 31 decreases through 90° of revolution until the laser beam 1 reaches the 180° position. At the 180° position, the laser beam illuminates the retro-reflector 31 with the least amount of light or energy during each revolution, since the level of illumination or intensity of the laser beam is weakest at the outer diameter of the laser beam 1. Once the deflecting laser beam 1 traverses the 180° position, the laser beam 1 illuminates the retro-reflector 31 with an increasing level of illumination or intensity until the beam 1 reaches the zero position again, as shown in FIG. 3. Effectively then, for each revolution that the laser beam 1 takes, the photo-detector 33 generates a sinusoidal signal, except of course, when the signal $E_s$ has a DC level. Since the retro-reflector 31 is disposed at position B along the zero axis, the error signal $E_s$ is in phase with the reference voltage $E_2$, but out of phase with the other reference voltage $E_1$. Therefore, the altitude servo motor 27 remains in the rest state while the azimuth motor 12 continuously drives the azimuth plate 11 through gear 13 until a DC signal is derived by the photodetector 33. The photo-detector 33 derives a DC signal, of course, when the retro-reflector 31 is disposed at the center of the circle 40.

The amplitude of the error signal $E_S$ is a function of the displacement of the retro-reflector 31 with respect to the center of the circle 40. It may be seen that as the amplitude of the error signal increases, the difference in the reference signal voltage $E_1$ or $E_2$ is appreciable, and the azimuth or altitude servo motor 12, 27 respectively, may operate at a high speed in response thereto, and will operate at a slower speed when the amplitude of the error signal $E_s$ is lowered.

The above discussion of the significance of the amplitude of the error signal $E_s$ may be seen in FIG. 6, wherein the sinusoidal signal $E_S$ is derived when the retro-reflector 31 is at position C. In FIG. 6, the retro-reflector 31 is shown at position C along the zero axis, so that the error signal $E_S$ will be in phase with the reference voltage $E_2$, but out of phase with the reference voltage $E_1$. The error signal $E_s$ is shown somewhat in pulse form since the laser beam 1 illuminates the retro-reflector 31 for only a given instant of time during each revolution. The remaining time in each revolution the retro-reflector 31 is not illuminated and, in effect, is in a period of darkness for part of each revolution of the laser beam 1. The altitude servo motor 27 will remain in the inactive state since the altitude reference voltage $E_2$ and the sinusoidal signal $E_s$ are in phase with respect to each other; however, as previously described above, the azimuth reference voltage $E_1$ is out of phase with the error signal $E_s$, and therefore, the azimuth motor 12 will rotate the azimuth plate 11, while the altitude motor 27 remains at rest. Inasmuch as the servo motors respond only to phase differences 90° on each side of 0°, the system operates in a similar manner when the retro-reflector is in the third quadrant.

Referring to FIG. 7, the electrical wave shapes of the reference voltages $E_1$, $E_2$ and $E_s$ are shown when the retro-reflector is disposed at position D (FIG. 3). The retro-reflector 31 is illuminated by varying intensity during each revolution of the laser beam 1, however, the phase angle of the error signal $E_s$ is shifted now because the greatest amount of illumination on the retro-reflector 31 occurs at a different position in time with respect to each cycle of the reference voltages $E_1$ and $E_2$. The output voltage wave shape of the error signal $E_s$ from the photo-detector 33 leads the reference voltage $E_1$ and lags the reference voltage $E_2$.

The tracking system 10 may include an electrical filter 41 which will eliminate all frequencies except those signals having a given frequency, such as 60 c.p.s., so that if the laser beam is modulated for purposes of communication, the tracking system 10 may still operate at the given frequency independent of the modulated signal carried by the laser beam 1.

While one embodiment of the invention has been described, variations thereof and modifications therein within the spirit of the invention will undoubtedly suggest themselves to those skilled in the art. Accordingly, the foregoing description should be taken as illustrative and not in any limiting sense.

What is claimed is:

1. A tracking system for aligning an optical beam projected from a transmitting point to a target, said system comprising, (a) a laser at said transmitting point for generating said beam, (b) means including a corner cube retro-reflector at said target for reflecting at least a portion of said beam substantially along the same straight path from whence said beam came, (c) an azimuth plate rotatable in a horizontal plane at said transmitting point, (d) a tiltable mirror on said plate in registry with said beam for projecting said beam toward said target, (e) means for maintaining said beam in registry with said mirror while said azimuth plate is being rotated, (f) a rotatable optical wedge mounted on said plate and interposed between said transmitting point and said target for deflecting said projected beam in a circular path about said retro-reflector in a given circle which is being generated incrementally by said beam, (g) a source of first and second orthogonal alternating current reference voltages of the same frequency, (h) means connected to said source for rotating said optical wedge in synchronism with said first and second reference voltages, (i) photo-detector means mounted on said plate responsive to said reflected beam for deriving a direct current voltage when said circular path of said beam is coaxial with said retro-reflector, and an alternating current error voltage having a variable phase angle and amplitude which is a function of the misalignment of said beam with respect to said retro-reflector, (j) an azimuth servo means coupled to said photo-detector means and said plate for rotating said plate when said error voltage is out of phase with said first reference voltage when applied thereto, (k) an altitude servo means coupled to said photo-detector means and said mirror for tilting said mirror when said error voltage is out of phase with said second reference voltage when applied thereto, and (m) said azimuth and said altitude means being in a rest state when said error voltage is a direct current voltage.

References Cited

UNITED STATES PATENTS

| | | | |
|---|---|---|---|
| 2,513,367 | 7/1960 | Scott | 250—203 X |
| 3,287,562 | 11/1966 | Connors et al. | 250—236 X |
| 3,378,687 | 4/1968 | Schepler | 250—203 |
| 2,396,112 | 3/1946 | Morgan | 343—16 X |
| 2,473,175 | 6/1949 | Ridenour | 343—7.4 |
| 2,594,317 | 4/1952 | Lancor et al. | 343—7.4 X |
| 2,740,901 | 4/1956 | Graham | 343—7.4 X |
| 2,743,355 | 4/1956 | Sink | 343—16 X |
| 3,072,794 | 1/1963 | Ostergren. | |
| 3,270,612 | 9/1966 | Collyer. | |
| 3,293,643 | 12/1966 | Blomqvist | 343—7.4 |
| 3,323,408 | 6/1967 | Bishop et al. | |
| 3,360,987 | 1/1968 | Flower et al. | |
| 3,364,356 | 1/1968 | Jones. | |

OTHER REFERENCES

Electronic News article entitled "Amplification as High as 258 gc. Achieved With Resonant Structure," vol. 11, June 13, 1963, p. 4.

RONALD L. WIBERT, Primary Examiner

THEODORE MAJOR, Assistant Examiner